United States Patent [19]

Thaler et al.

[11] Patent Number: 5,201,420
[45] Date of Patent: Apr. 13, 1993

[54] NON-TACKY HOT MELT ADHESIVE CONTAINING PACKAGE

[75] Inventors: Martin D. Thaler, Somerville; Robert W. Giese, Wall; Paul Puletti, Pittstown; Robert Schmidt, Great Meadows, all of N.J.

[73] Assignee: National Starch and Chemical Investment Holding Corporation, Wilmington, Del.

[21] Appl. No.: 886,720

[22] Filed: May 21, 1992

Related U.S. Application Data

[62] Division of Ser. No. 533,301, Jun. 4, 1990.

[51] Int. Cl.⁵ .............. B65D 57/00; B65D 85/00; B29C 39/06
[52] U.S. Cl. .................. 206/447; 206/813; 264/255; 427/422
[58] Field of Search .......... 264/12, 13, 14, 129, 264/130, 279.1, 210.1, 211.13, 517, 338, 121, 255; 427/207.1, 422, 424, 133; 206/447, 813, 524.3, 524.6

[56] References Cited

U.S. PATENT DOCUMENTS

| | | | |
|---|---|---|---|
| 2,648,487 | 8/1953 | Linda | 206/447 X |
| 2,791,327 | 5/1957 | Sparks et al. | 206/447 |
| 2,977,267 | 3/1961 | Doothitt | 206/447 |
| 3,166,613 | 1/1965 | Wright et al. | 264/12 |
| 3,719,733 | 3/1973 | Rakestraw et al. | 264/9 |
| 3,755,527 | 8/1973 | Keller et al. | 264/210 F |
| 3,961,106 | 6/1976 | Heytmeyer et al. | 427/422 X |
| 3,978,185 | 8/1976 | Buntin et al. | 264/93 |
| 4,048,364 | 9/1977 | Harding et al. | 428/113 |
| 4,092,089 | 5/1978 | Bocker et al. | 425/10 |
| 4,136,134 | 1/1979 | Plaisted | 206/813 X |
| 4,150,192 | 4/1979 | Downey | 427/422 X |
| 4,212,910 | 7/1980 | Taylor et al. | 206/813 X |
| 4,260,699 | 4/1981 | Plaisted | 206/813 X |
| 4,420,518 | 12/1983 | Progar | 206/447 X |
| 4,748,796 | 6/1988 | Viel | 53/411 |
| 4,755,245 | 7/1977 | Viel | 156/227 |
| 4,911,956 | 3/1990 | Gabryszewski et al. | 427/424 |

FOREIGN PATENT DOCUMENTS 2544654 10/1984 France .
2601616 1/1988 France .
48-103635 12/1973 Japan .

*Primary Examiner*—Jimmy G. Foster
*Assistant Examiner*—Jacob K. Ackun, Jr.
*Attorney, Agent, or Firm*—Eugene Zagarella, Jr.; Edwin M. Szala

[57] ABSTRACT

A tackless hot melt adhesive package is provided by using a hydrogenated castor oil coating material and a low pressure, melt blow application technique.

8 Claims, 2 Drawing Sheets

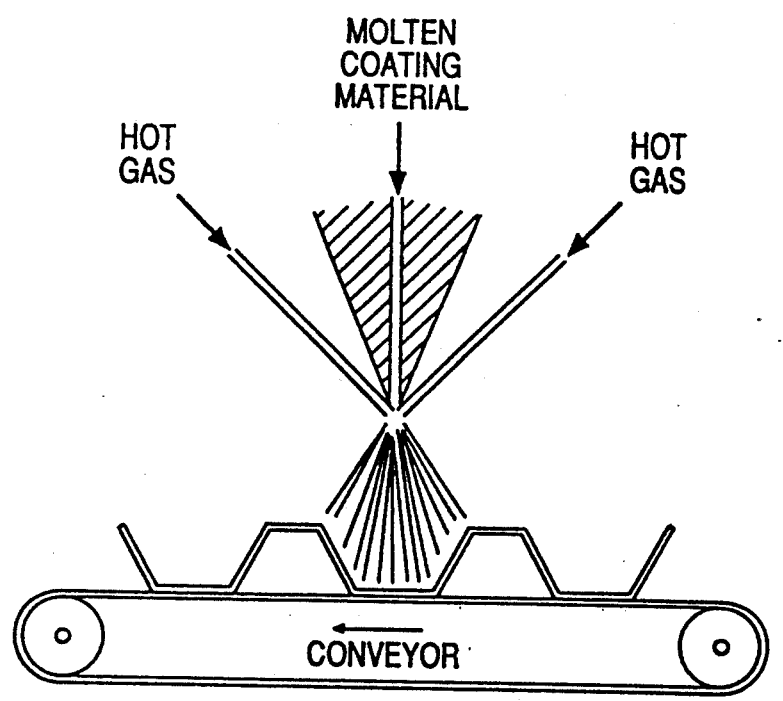

NON-TACKY HOT MELT ADHESIVE CONTAINING PACKAGE

This application is a division of application Ser. No. 07/533,301, filed Jun. 4, 1990.

BACKGROUND OF THE INVENTION

This invention relates to a package containing a tackless or non-blocking hot melt adhesive and to the method for producing such packaging wherein a selected wax coating material and a low pressure, melt blow application technique are used.

Hot melts adhesives which are generally applied and distributed while in the molten or liquid state are solid at room temperature. Typically, these adhesives are provided in the form of blocks and because of the nature of these materials, particularly the pressure sensitive hot melts, there are problems associated with handling and packaging them. Blocks and other forms of these materials not only stick or adhere to hands or mechanical handling devices and to each other, but they also pick up dirt and other contaminants. Additionally, certain applications which require high tack formulations result in blocks that will deform or cold flow unless supported during shipment. The need and advantage of providing a tackless or non-blocking adhesive is therefore quite apparent and various ways of accomplishing this have been tried and developed over many years.

Japanese Patent Bulletin 48-103635 published Dec. 26, 1973 discloses a granular adhesive which is tacky at room temperature and coated or enveloped with a non-tacky, hot meltable material that is the same type or is miscible or mixable with it.

French Patent 2,544,654 published Oct. 26, 1984 discloses forming a tackless hot melt by adding molten hot melt to a mold containing a preformed support layer having a transfer film thereon and which is compatible with the hot melt.

U.S. Pat. Nos. 4,748,796 issued Jun. 12, 1988 and 4,755,245 issued Jul. 5, 1988 disclose forming a protective coating for an adhesive material by electrostatically coating a mold or cavities with a powder screen and then pouring hot melt into the mold.

French Patent 2,601,616 published Oct. 22, 1988 discloses forming blocks of hot melt pressure sensitive adhesives by casting the pressure sensitive adhesive into molds precoated by spraying with a film of non self-sticking hot melt material thereby forming a fusible non-tacky veil around the pressure sensitive block.

Various other methods of making tackless hot melt adhesives have also been developed. However, despite all these techniques which include many alleged compatible, non-adhesive coating materials and a number of different application systems and equipment, there are still problems in producing a thin, continuous, adherent coating which is completely compatible with the hot melt adhesive and most important is not brittle and will not flake or rub off during handling.

SUMMARY OF THE INVENTION

Now in accordance with this invention, a package containing a tackless pressure sensitive hot melt adhesive is provided by the use of a selected high melting, hard wax coating material which is applied using a low pressure, melt blow application technique.

More particularly, the tackless pressure sensitive hot melt adhesive package of this invention is provided by melt blowing molten hydrogenated castor oil through orifices of a heated die plate into a fine stream of hot inert gas which surrounds or curtains the molten hydrogenated castor oil forming droplets which deposit a thin, adherent and uniform coating into a preformed support cavity, the molten hydrogenated castor oil being at a temperature of about 190° F. to 300° F., the gas being at a temperature of from about 190° to 300° F. and a pressure of from about 10 to 50 psig, the hydrogenated castor oil flow rate being sufficient to deposit a thin, uniform coating of about 0.05 to 1% by weight of hydrogenated castor oil based on the weight of hot melt adhesive, and after coating, casting the pressure sensitive hot melt into the coated cavity. The invention provides a convenient means of storing and shipping hot melt adhesives, including those susceptible of blocking when shipped and stored in accordance with conventionally known procedures.

BRIEF DESCRIPTION OF THE DRAWINGS

FIG. 2 also illustrates schematically the melt blow procedure of this invention showing a side sectional view of the die plate with the molten coating and gas passages.

DETAILED DESCRIPTION OF THE INVENTION

Figure 1:
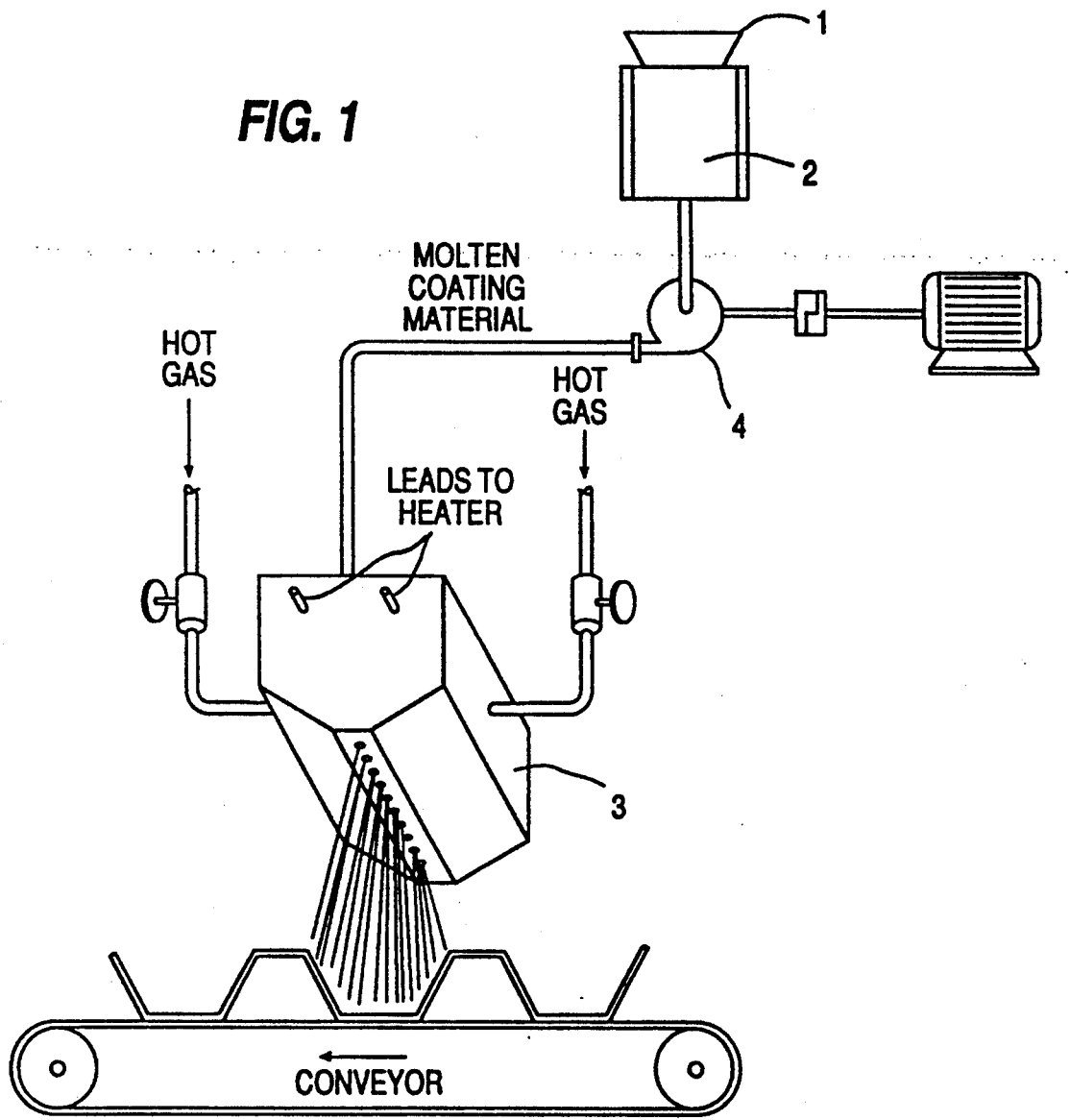
FIG. 1 illustrates schematically the melt blow application procedure in accordance with the present invention.

The tackless pressure sensitive adhesive package of this invention involves two distinct and significant aspects, i.e., a selected hard wax coating material and a particular melt blow application technique.

While various compatible materials have been suggested for use as a coating material for forming tackless adhesives including the hot melt polymers and copolymers, waxes and paraffins, not all have given the results desired especially being able to provide a thin, uniform compatible coating which will adhere to the hot melt and is not brittle or flaky, particularly when a release agent such as silicone is first applied to the cavity package. In this invention, a very selected high melting, hard wax is used to provide the tackless or non-tacky coating. This hard wax is hydrogenated castor oil or the triglyceride of 12-hydroxystearic acid. The hydrogenated castor oil wax material is a well known commercially available material sold under tradenames such as Castorwax, Opalwax, Ric-Syn Wax, Cenwax G and Sanfol 101-E. This wax material which is compatible with hot melt adhesives has a melting point of about 185° to 192° F. (85° to 89° C.), a hydroxy value of about 155 to 160 and a penetration hardness of about 2. Other variations of this wax such as Castorwax MP 70 and 80 which have similar properties may also be used.

In combination with the selected wax coating composition described above, the ability to provide the desired coating results from the use of a particular low pressure melt blow application technique. Many different application procedures have been used or tried to provide tackless coatings on an adhesive including brushing, rolling, spraying and electrostatic coating. The suitability of a particular application technique depends on the selected coating material and the desired characteristics of the coating. It has been difficult to find a suitable coating material and application system which will provide a thin, uniform, compatible coating for the pressure sensitive hot melt adhesive that is not only completely compatible and does not reduce adhesion but also is not brittle or flaky, particularly when used in a flexible cavity, including one that is coated with a release agent. The melt blow application, as described hereinafter, when used in combination with the defined hard waxy material surprisingly provides a desired thin, continuous coating that adheres well and does not flake off when handled.

The coating application technique as used in this invention is a low pressure, melt blow procedure similar to that described in U.S. Pat. Nos. 3,755,527 issued Aug. 28, 1973; 3,978,185 issued Aug. 31, 1976 and 4,048,364 issued Sep. 13, 1977 and can be better understood from a review of FIG. 1 which schematically illustrates the process. As shown in the drawing, the wax coating material is added through inlet hopper 1 and melted in heating chamber 2 before it is pumped by pump 4 into the nozzle die head 3. The die head contains heating means (not shown) with leads to the heater as shown, to control the temperature of the nozzle die head. The gas or air stream which blows or disperses the molten wax into small droplets is provided through gas outlet slots or jets (not shown) in the die head. As shown in FIG. 2, the hot gas curtains or envelopes the molten coating material as it exits one of the orifices in the die plate. These gas slots are supplied with hot gas by inlet gas lines shown in FIG. 1. The molten wax is forced out of a row of nozzle orifices or die openings in the nozzle die head into a gas stream which provides a fine spray or stream of wax droplets into an open cavity which is moving on a conveyor belt or other moving device.

The wax coating material is heated in the heating chamber to a temperature of from about 190° to 300° F. and preferably from about 200° to 250° F. and remains at this temperature when it reaches the orifices in the heated nozzle or die head. The gas, which is an inert gas, preferably air, is provided at a temperature of about 190° to 300° F., preferably from about 200° to 250° F., and is generally at the same or slightly higher temperature than the nozzle die temperature. Air pressure is generally at about 10 to 50 psig, preferably from about 20 to 40 psig.

The flow rate for the wax coating material will vary depending on the amount of coating deposit desired and the rate of speed at which the support cavities are being fed into the system. Generally, the rate of the wax and air flows will be an amount that will effectively provide a thin, uniform coating deposit and more particularly this will be from about 0.05 to 1% by weight, preferably 0.1 to 0.5% and more preferably 0.1 to 0.3% by weight of wax based on the total weight of the hot melt adhesive. When feeding cavities at the rate of 16 ft/min, the wax flow rate will typically vary from about 50 to 750 g/min and preferably from about 70 to 400 g/min. The air will be at a flow rate of generally from about 3 to 50 SCFM and more particularly from about 5 to 20 SCFM. The distance between the die head and the bottom of the cavity as shown in FIGS. 1 and 2 can be varied as desired depending on other conditions to get the desired coating. Generally the distance may vary between 1 to 10 inches and more particularly between 1 to 5 inches.

While the conditions, particularly temperatures and flow rates and pressure may be varied as described above, the important aspect of this invention is that the discrete molten droplets of coating wax that are formed when leaving the die head remain at a relatively high, near molten or higher temperature when it is deposited in the cavity to obtain a good adherent coating.

The hot melt adhesive used in the invention may be any of the known materials used for this purpose including polymers and copolymers of synthetic resins, rubbers, polyethylene, polypropylene, acrylics, vinyl acetate, ethylene vinyl acetate and polyvinyl alcohol. Examples of representative adhesives include those based on:

a) rubber polymers such as block copolymers of monovinyl aromatic hydrocarbons and conjugated diene, e.g., styrene-butadiene, styrene-butadiene-styrene (SBS), styrene-isoprene-styrene (SIS), styrene-ethylene-butylene-styrene (SEBS), and styrene-ethylene-propylene-styrene (SEPS);

b) ethylene-vinyl acetate polymers, other ethylene esters and copolymers, e.g., ethylene methacrylate, ethylene n-butyl acrylate and ethylene acrylic acid;

c) polyolefins such as polyethylene and polypropylene;

d) polyvinyl acetate and random copolymers thereof;

e) polyacrylates;

f) polyamides;

g) polyesters; and h) polyvinyl alcohols and copolymers thereof.

Most often such adhesives are formulated with tackifying resins in order to improve adhesion and introduce tack into the adhesive. Such resins include (a) natural and modified resins, (b) polyterpene resins, (c) phenolic modified terpene resins, (d) coumarons-indene resins, (e) aliphatic and aromatic petroleum hydrocarbon resins, (f) phthlate esters and g) hydrogenated hydrocarbons, hydrogenated rosins and hydrogenated rosin esters.

Desirable optional ingredients include diluents, e.g., liquid polybutene or polypropylene, petroleum waxes such as paraffin and microcrystalline waxes, polyethylene greases, hydrogenated animal, fish and vegetable fats, mineral oil and synthetic waxes. In some cases, an essentially hydrocarbon oil is required in the formulation, typically called naphthenic or paraffinic mineral oils.

Other optional additives may include stabilizers, antioxidants, colorants and fillers.

The selection of components and preparation of hot melt adhesives is well known in the art and described in the literature.

The cavity or support or tray which forms part of the pressure sensitive hot melt package may be any of the materials known to be useful for this purpose including polypropylene and polyethylene, polyester sheets, polycarbonate, rubber modified polystyrene, polyamide (nylon), paper including paper coated with polyester or cardboard, silicone rubber and teflon. Filled polypropylene (e.g., filled with talc or titanium dioxide) is a preferred material for the preformed support cavity. The term support cavity as used herein includes cavities, supports, trays and other forms made of the above and similar materials and which make up this package containing the pressure sensitive hot melt adhesive. It is further noted that the support cavity used in making up the adhesive package of this invention and containing the tackless hot melt adhesive can be used as a shipping and or storage container. It is also noted that after the hot melt adhesive is cast into the open and coated preformed support cavity, a similar melt blown deposit may be coated on the uncoated hot melt adhesive (surface) or a lid or top (may be made of same material as rest of support cavity) precoated with hydrogenated castor oil can be pressed against the uncoated hot melt adhesive surface.

A release agent is most often used to ease separation of the package or support cavity from the tackless hot melt adhesive at the time of use. Materials useful as release agents include silicone, fluoropolymers and polyolefins with silicone being preferred in this application.

The following examples will further illustrate the embodiments of this invention. In the examples all parts are by weight unless otherwise indicated.

EXAMPLE 1

A tackless pressure sensitive hot melt adhesive package was produced as follows. An open flexible polypropylene filled (talc) film capable of withstanding high temperatures was initially given a thin coating of silicone and this film was thermoformed to form cavities of a desired size (4.5×10.5×4 inches). Following this, with the silicone coating on the interior surface, a thin, continuous coating of hydrogenated castor oil (Castorwax) was melt blown using an application technique similar to that shown in FIGS. 1 and 2 described in the specification. Application conditions were as follows: a wax temperature of about 230° F., an air temperature of about 230° F. with air pressure of 25 psig. The wax and air flow rates were adjusted to give droplets forming a suitable continuous thin coating corresponding to a coating of about 0.2% by weight based on the total weight of the hot melt adhesive.

A hot melt adhesive comprising a Kraton styrene-butadiene rubber elastomer, paraffin oil and a hydrocarbon tackifying resin was cast into the coated open cavity. A similar thin, continuous coating was applied to the previously uncoated top of the hot melt adhesive package.

Separating the polypropylene package material from the hot melt showed a tackless smooth adhesive block with an adherent coating that did not flake or rub off when handling either the full package or separated block. Further use of the adhesive indicated good compatibility between the hot melt and the adhesive and most important the properties of the hot melt adhesive were not altered or modified in any significant way.

What is claimed is:

1. A tackless hot melt package which is produced by the method comprising melt blowing molten hydrogenated castor oil through orifices of a heated die plate which is curtained by a stream of hot inert gas to form droplets which deposit a thin, adherent, continuous coating in a preformed support cavity, the molten hydrogenated castor oil being heated to a temperature of about 190° to 300° F., the inert gas being at a temperature of from about 190° to 300° F. and a pressure of from about 10 to 50 psig, the hydrogenated castor oil being at a sufficient flow rate to deposit a coating of about 0.05 to 1% by weight of hydrogenated castor oil based on the weight of the hot melt, and casting a hot melt adhesive into the preformed cavity, and depositing a similar thin melt blown coating of hydrogenated castor oil on the uncoated adhesive top surface of the formed hot melt package.

2. The tackless hot melt package of claim 1 wherein air is the inert gas, the hydrogenated castor oil is heated to a temperature of from about 200° to 250° F., the air pressure is from about 20 to 40 psig, a film or coating of silicone release agent is applied to the support cavity prior to application of the hydrogenated castor oil, the support cavity is made of filled polypropylene, the hot melt comprises a rubber copolymer and from about 0.1 to 0.5% by weight of hydrogenated castor oil is deposited in the support cavity.

3. The tackless hot melt package of claim 1 wherein the adhesive is a pressure sensitive hot melt adhesive.

4. The hot melt package of claim 1 wherein a film or release agent is provided between the support cavity and the hydrogenated castor oil and wherein the support cavity is made of filled polypropylene and the release agent is silicone.

5. The package of claim 4 wherein the hot melt comprises a rubber copolymer and from about 0.1 to 0.5% by weight of hydrogenated castor oil coating based on the weight of hot melt is used.

6. The pressure sensitive hot melt adhesive package of claim 3 wherein air is the inert gas, the hydrogenated castor oil is heated to a temperature of from about 200° to 250° F. and the air pressure is from about 20 to 40 psig.

7. The pressure sensitive hot melt adhesive package of claim 6 wherein a film or coating of release agent is applied to the support cavity prior to application of the hydrogenated castor oil.

8. The pressure sensitive hot melt adhesive package of claim 7 wherein the support cavity is made of filled polypropylene, the release agent is silicone and from about 0.1 to 0.5% by weight of hydrogenated castor oil coating is deposited in the support cavity.

* * * * *